(12) United States Patent
Park

(10) Patent No.: US 11,377,225 B2
(45) Date of Patent: Jul. 5, 2022

(54) FUEL SUPPLY SYSTEM FOR AERIAL VEHICLE

(71) Applicant: AGENCY FOR DEFENSE DEVELOPMENT, Daejeon (KR)

(72) Inventor: Jeong-Bae Park, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 16 days.

(21) Appl. No.: 16/732,493

(22) Filed: Jan. 2, 2020

(65) Prior Publication Data
US 2021/0086909 A1    Mar. 25, 2021

(30) Foreign Application Priority Data
Sep. 23, 2019 (KR) .......................... 10-2019-0116549

(51) Int. Cl.
*B64D 37/10* (2006.01)
*B64D 37/04* (2006.01)
*F02M 37/00* (2006.01)

(52) U.S. Cl.
CPC ............. *B64D 37/10* (2013.01); *B64D 37/04* (2013.01); *F02M 37/0088* (2013.01)

(58) Field of Classification Search
CPC ..... B64D 37/10; B64D 37/04; F02M 37/0088
USPC ........................................................ 137/255
See application file for complete search history.

(56) References Cited

U.S. PATENT DOCUMENTS

| 1,690,072 | A | * | 10/1928 | Johnson | ................... | A62C 4/00 |
|  |  |  |  |  |  | 220/721 |
| 2,736,356 | A | * | 2/1956 | Oates, Jr. | ............... | B64D 37/06 |
|  |  |  |  |  |  | 280/830 |
| 2,758,747 | A | * | 8/1956 | Stevens | .................. | B65D 88/62 |
|  |  |  |  |  |  | 406/146 |
| 3,383,078 | A | * | 5/1968 | Shohet | ................... | B64D 37/04 |
|  |  |  |  |  |  | 244/135 R |
| 3,693,825 | A | * | 9/1972 | Richman | .......... | B60K 15/03504 |
|  |  |  |  |  |  | 220/227 |
| 4,508,068 | A | * | 4/1985 | Tuggle | .................... | F02B 63/02 |
|  |  |  |  |  |  | 261/DIG. 8 |
| 4,886,225 | A | * | 12/1989 | Bates | ..................... | B64D 37/32 |
|  |  |  |  |  |  | 220/900 |
| 5,647,329 | A | * | 7/1997 | Bucci | ..................... | F02M 37/50 |
|  |  |  |  |  |  | 123/509 |

(Continued)

FOREIGN PATENT DOCUMENTS

| JP | 2003-226295 A | 8/2003 |
| JP | 6163041 B2 | 7/2017 |
| KR | 10-1925936 B1 | 12/2018 |

*Primary Examiner* — Logan M Kraft
*Assistant Examiner* — John D Bailey
(74) *Attorney, Agent, or Firm* — LRK Patent Law Firm

(57) ABSTRACT

A fuel supply system for an aerial vehicle includes: a plurality of fixed tanks storing fuel; a variable tank provided in a fixed tank of the plurality of fixed tanks and storing fuel; a fuel supply flow path, a first end of which is connected to the variable tank and passing through the plurality of fixed tanks; and a fuel pump provided in a fixed tank which does not have the variable tank, an outlet side of the fuel pump being connected to the fuel supply flow path. According to the fuel supply system, continuous fuel supply is performed despite the change of the attitude or acceleration of an aerial vehicle, sufficient fuel is stored, and constraints on fuel tank design are minimized.

6 Claims, 1 Drawing Sheet

(56) References Cited

U.S. PATENT DOCUMENTS

| | | | | |
|---|---|---|---|---|
| 5,913,451 A * | 6/1999 | Madison | B60K 15/061 | 220/900 |
| 5,979,481 A * | 11/1999 | Ayresman | B60K 15/03 | 220/721 |
| 6,021,978 A * | 2/2000 | Goss | B64D 37/32 | 244/135 B |
| 6,260,544 B1 * | 7/2001 | Spry | B60K 15/03504 | 220/721 |
| 6,360,729 B1 * | 3/2002 | Ellsworth | B60K 15/03 | 123/518 |
| 6,405,744 B1 * | 6/2002 | LaPant | F02D 19/0623 | 137/255 |
| 6,681,789 B1 * | 1/2004 | Moulis | F16K 24/04 | 220/88.3 |
| 6,698,692 B1 * | 3/2004 | Tichenor | B64D 37/24 | 96/155 |
| 6,755,219 B1 * | 6/2004 | Bolle | B01J 7/02 | 141/59 |
| 6,889,940 B1 * | 5/2005 | Howe | B64D 39/00 | 244/135 R |
| 9,623,980 B2 * | 4/2017 | Meillat | B64D 37/24 | |
| 9,809,319 B2 * | 11/2017 | Burnell | B64D 37/14 | |
| 10,731,639 B2 * | 8/2020 | Takacs | B64D 37/06 | |
| 2004/0262455 A1 * | 12/2004 | Picot | B64D 37/32 | 244/135 R |
| 2005/0178880 A1 * | 8/2005 | Howe | B64D 37/04 | 244/10 |
| 2008/0099079 A1 * | 5/2008 | Johnson | B64C 17/10 | 137/255 |
| 2009/0090724 A1 * | 4/2009 | Childress | B64D 37/06 | 244/135 R |
| 2009/0314783 A1 * | 12/2009 | Losinski | B64D 37/16 | 220/721 |
| 2012/0279395 A1 * | 11/2012 | K-WLam | B64D 37/32 | 244/135 R |
| 2015/0151845 A1 * | 6/2015 | Jones | B64D 37/32 | 244/135 R |
| 2015/0159771 A1 * | 6/2015 | Goguet-Chapuis | F02C 7/232 | 137/492.5 |
| 2016/0009406 A1 * | 1/2016 | Burnell | B64D 37/10 | 244/135 R |
| 2020/0164999 A1 * | 5/2020 | Heilman | B64D 37/08 | |

\* cited by examiner

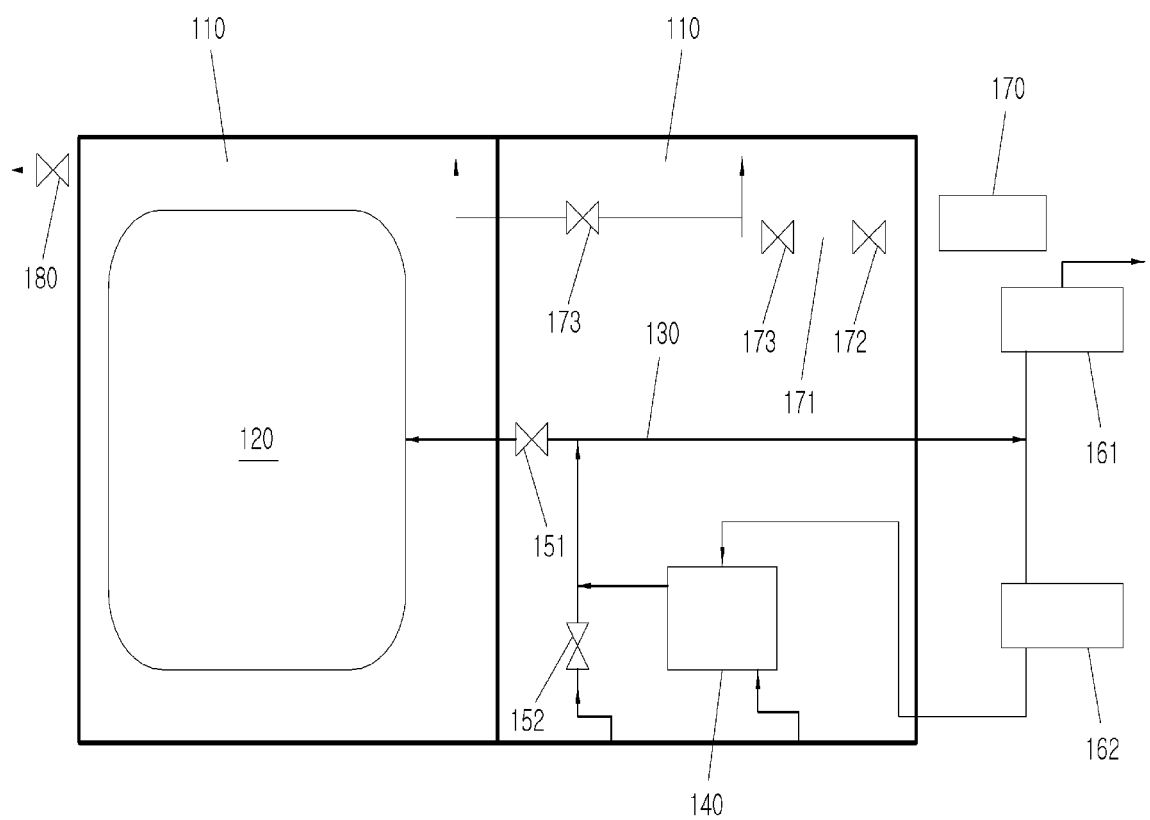

FUEL SUPPLY SYSTEM FOR AERIAL VEHICLE

CROSS REFERENCE TO RELATED APPLICATION(S)

This application claims the benefit of Korean Patent Application No. 10-2019-0116549, filed on Sep. 23, 2019, which is hereby incorporated by reference in its entirety into this application.

BACKGROUND OF THE INVENTION

1. Technical Field

The present invention relates to a system supplying fuel to a fuel consuming device from a fuel storage device in an aerial vehicle.

2. Description of Related Art

There has been a continuing need for a fuel transfer/supply system capable of continuously transferring fuel to a propulsion system irrespective of the changes of the attitude and acceleration of an aerial vehicle in flight.

In an existing fuel supply system, a method of transferring fuel by using an electric pump, a method of transferring fuel by pressure increased by pressurizing a fixed tank of storing fuel by using gas, and a method of transferring fuel by using these two methods combined together have generally been applied.

However, according to such fuel transfer methods, fuel does not reach a pump or an inlet of a transfer pipe in an environment in which the position of fuel is changed according to the changes of the attitude and acceleration of an aerial vehicle. Accordingly, there is a problem that fuel transfer is stopped or pressurizing gas is transferred instead of the fuel. Eventually, if this happens, the fuel supply is interrupted and flight is not maintained.

In order to solve the above problems, a method of supplying fuel by storing the fuel in a variable tank which can be changed in volume may be considered.

In such a method, the variable tank, which can contract and expand, is mounted in the fixed tank, fuel is stored in the variable tank to completely fill the variable tank without bubbles, and during flight, the fuel is squeezed out by pressurizing the outside of the variable tank to be transferred. In a system using this method, the variable tank is located between fuel and pressurizing gas, fundamentally blocking the pressurizing gas from mixing with the fuel. Accordingly, the gas may be prevented from being transferred during the fuel transfer, and the fuel transfer may be prevented from being interrupted even when the acceleration or attitude of an aerial vehicle is changed.

However, there is a constraint that the configuration of the inside of the fixed tank is required to be simplified since the variable tank is required to be operated by storing all fuel only in the variable tank. Furthermore, to prevent the damage of the variable tank in operation, sharp structures are required to be absent in the fixed tank, and the structural design of the fixed tank is needed to ensure that a fixed tank structure does not interfere with the variable tank during the contraction of variable tank. In addition, since the variable tank is required to be mounted inside the fixed tank, weight increase and fuel loading capacity decrease occur. Accordingly, the design of a fuel transfer system is limited. Furthermore, the fuel loading capacity is also limited.

The matters described in the related art are provided to facilitate the understanding of the background of the present invention, and may include matters that are not known to those skilled in the art.

SUMMARY OF THE INVENTION

The present invention has been made in an effort to solve the problems and an object of the present invention is to propose a fuel supply system for an aerial vehicle, wherein continuous fuel supply is performed despite the change of the attitude or acceleration of an aerial vehicle, sufficient fuel is stored, and constraints on fuel tank design are minimized.

In order to achieve the objectives of the present invention, according to one aspect of the present invention, there is provided a fuel supply system for an aerial vehicle, the system including: a plurality of fixed tanks storing fuel; a variable tank provided in a fixed tank of the plurality of fixed tanks and storing fuel; a fuel supply flow path, a first end of which is connected to the variable tank and passing through the plurality of fixed tanks; and a fuel pump provided in a fixed tank which does not have the variable tank, an outlet side of the fuel pump being connected to the fuel supply flow path.

In addition, when the fuel contained in the fixed tank which does not have the variable tank is supplied to the fuel supply flow path by operation of the fuel pump, the fuel contained in the variable tank may not be supplied to the fuel supply flow path.

Furthermore, a first fuel control valve may be provided in the fuel supply flow path at a front side of the fuel pump so as to control fuel supply from the variable tank.

In addition, during the fuel supply from the variable tank, fuel may be refilled to the variable tank by a fuel refilling means.

Furthermore, a pressure discharge valve may be provided in the fixed tank having the variable tank, and pressure of the fixed tank may be discharged to the outside via the pressure discharge valve when refilling the variable tank with fuel.

Additionally, the fuel supply system may further include a pressurizing tank storing pressurizing gas to pressurize the plurality of fixed tanks.

In addition, the fuel supply system may further include a pressurizing flow path connected to the plurality of fixed tanks from the pressurizing tank; and a plurality of pressure control valves provided in the pressurizing flow path at locations inside the plurality of fixed tanks, respectively.

Here, control pressures of the plurality pressure control valves may be different from each other.

In addition, a high-pressure pump may be provided in the fuel supply flow path at a location outside the fixed tanks, the high-pressure pump supplying fluid to the fuel pump through the fuel supply flow path connected thereto.

Next, according to another aspect of the present invention, there is provided the fuel supply system for an aerial vehicle, the system including: the variable tank and the fixed tank in which fuel is stored; the fuel supply flow path connected to a fuel consuming device from the variable tank; and the fuel pump provided in the fixed tank, the outlet side of the fuel pump being connected to the fuel supply flow path, wherein the fuel stored in the variable tank or the fixed tank is selectively supplied to the fuel consuming device.

Here, a discharge fuel quantity of the fuel pump may be greater than a sum of a fuel quantity required at the fuel consuming device and a fuel quantity making discharge of the fuel contained in the variable tank to the fuel supply flow path unnecessary.

According to the fuel supply system for an aerial vehicle of the present invention, continuous fuel supply from the variable tank is performed despite the change of the attitude or acceleration of the aerial vehicle and the fixed tank is also used. Accordingly, sufficient fuel can be stored and constraints on fuel tank design can be minimized.

BRIEF DESCRIPTION OF THE DRAWING

The above and other objects, features and advantages of the present invention will be more clearly understood from the following detailed description taken in conjunction with the accompanying drawing, in which:

FIG. 1 roughly illustrates a fuel supply system for an aerial vehicle according to the present invention.

DESCRIPTION OF THE PREFERRED EMBODIMENT

In order to fully understand the operational advantages of the present invention and the objectives achieved by the practice of the present invention, reference should be made to the accompanying drawing which illustrates an exemplary embodiment of the present invention and contents described in the accompanying drawing.

In describing the exemplary embodiment of the present invention, well-known techniques or repeated descriptions that may unnecessarily obscure the subject matter of the present invention will be shortened or omitted.

FIG. 1 roughly illustrates a fuel supply system for an aerial vehicle according to the present invention. Hereinbelow, the fuel supply system for an aerial vehicle according to the embodiment of the present invention will be described with reference to FIG. 1.

The present invention relates to the system and method of supplying fuel to a propulsion system, which is a fuel consuming device, from a fuel storage tank in an aerial vehicle, wherein fuel supply can be prevented from being interrupted by the change of the position of fuel in the storage tank, which may be caused due to the change of acceleration or attitude of an aerial vehicle during flight.

To this end, according to the present invention, two different types of tanks of a fixed tank 110 and a variable tank 120 are provided, and fuel is selectively supplied therefrom, so that fuel supplying is not discontinued despite the changes of the attitude and acceleration of an aerial vehicle.

The variable tank 120 is a fuel storage tank made of an oil-resistant rubber or a material similar thereto and has flexibility. Accordingly, fuel in the variable tank is supplied to a fuel supply flow path 130 when the variable tank is pressurized from the outside, and the variable tank is provided inside the fixed tank 120.

The fuel supply flow path 130 is connected to the propulsion system consuming fuel supplied from the variable tank 120, and a first high-pressure pump 161 is provided in the fuel supply flow path 130 at a location outside the fixed tank 110 so as to supply fuel.

That is, the fixed tank 110 is provided by being divided into a plurality of compartments, and the variable tank 120 is provided in one fixed tank of the plurality of fixed tanks.

In addition, a fuel pump 140 is provided in the fixed tank 110 which is not provided with the variable tank 120, and an outlet side of the fuel pump 140 is connected to the fuel supply flow path 130 in the fixed tank 110.

Accordingly, in a normal state in which earth's gravity is applied, fuel in the fixed tank 110 is transferred by starting the fuel pump 140 since the fuel is disposed on a lower end of the fixed tank 110. In this state, the variable tank 120 is full of fuel and the fuel in the variable tank 120 is not used. The fuel pump for fuel transfer may be driven by an electric motor or a fluid, and may be driven by a high-pressure fluid supplied from the high-pressure pump. The discharge fuel amount of the fuel pump 140 is required to be greater than the sum of a fuel quantity required at a final stage (a fuel consuming device) and a fuel quantity making discharge of the fuel contained in the variable tank 120 to the fuel supply flow path unnecessary.

In this state, when fuel is not transferred to the fuel pump 140 since the fuel does not reach an inlet of the fuel pump 140 due to the changes of acceleration and attitude of an aerial vehicle, fuel contained inside the variable tank 120 is transferred. To this end, a first fuel control valve 151 is provided in the fuel supply flow path 130 at a front side of the fuel pump 140, and the first fuel control valve 151 is opened to supply the fuel contained in the variable tank 120 through the fuel supply flow path 130.

In this case, gas, not fuel, is supplied to the inlet of the fuel pump 140, and when outlet pressure exceeds inlet pressure by a predetermined degree or more, pressurizing gas supplied to the inlet is not transferred. Through such a principle, even in a situation in which the fuel transferred by the fuel pump 140 is difficult due to the changes of acceleration and attitude, the fuel contained in the variable tank 120 can be transferred.

After that, when the attitude and acceleration are changed back to the direction of earth's gravity and the fuel reaches the inlet of the fuel pump 140, the fuel is transferred again by the fuel pump 140. In this case, the discharge fuel quantity of the fuel pump 140 is greater than a fuel quantity required at the final stage, so the fuel is transferred to the final stage and, at the same time, the remaining fuel is refilled into the variable tank 120 by starting a fuel refilling means.

In addition, the first fuel control valve 151 is closed so that fuel is supplied no longer from the variable tank 120.

In addition, a second fuel control valve 152 is provided at the outlet side of the fuel pump 140 and controls whether to supply fuel to the fuel supply flow path 130 from the fuel pump 140.

After a predetermined time passes, fuel is filled inside the variable tank 120, and after that, when fuel cannot be supplied to the fuel pump 140 since the acceleration and attitude of an aerial vehicle are changed again, the fuel contained in the variable tank 120 can be used.

Furthermore, the fixed tank 110 may consist of fuel tanks divided into two or more compartments. Each of the fixed tanks 110 are used sequentially in the order of fuel transfer. Fuel can be transferred in the order of a right fixed tank (pressurizing/pumping transfer), a left fixed tank (pressurizing/pumping transfer), and the variable tank as illustrated in the drawing.

Another feature of the system of the present invention is a mechanism in which a large quantity of fuel can be used. That is, according to the mechanism of the present invention, a bypass flow path may be connected to the fuel pump 140, and a large quantity of fuel is supplied to the fuel pump 140 via a pressurizing method by a bypass pipe of a large diameter located at the inlet of the fuel pump 140 such that a fuel quantity larger than the discharge fuel quantity of the fuel pump is supplied to the fuel pump when the large quantity of fuel is initially required to be transferred, and then the bypass flow path is blocked and the fuel is supplied by the fuel pump 140. This mechanism has the advantage of selectively supplying a fuel quantity larger than the discharge fuel quantity of the fuel pump.

Meanwhile, a pressurizing tank 170 storing the pressurizing gas is provided to pressurize the fixed tank 110, and a pressurizing flow path 171 is connected to the fixed tank 110 from the pressurizing tank 170.

Furthermore, a pressurizing flow path opening/closing valve 172 is provided to control the supply of the pressurizing gas through the pressurizing flow path 171.

In addition, pressure control valves 173 may be provided in the pressurizing flow path 171 for pressure control, and there is difference between pressure of pressurizing only the fixed tank and pressure of pressurizing the variable tank. Accordingly, the plurality of pressure control valves 173 may be operated by using control pressures different from each other. For example, external pressure applied to the variable tank 120 may be greater by a predetermined degree or more than pressure applied to the fixed tank 110 which is not provided with the variable tank 120.

Next, a pressure discharge valve 180 is connected to the fixed tank 110 to which the variable tank 120 is mounted, and allows pressure in the fixed tank 110 to be discharged to the outside when fuel is filled in the variable tank 120. That is, external pressure is reduced to expand the variable tank 120 from a contracted state thereof so that refueling is facilitated.

In addition, a second high-pressure pump 162, apart from the first high-pressure pump 161, may be provided in the fuel supply flow path 130 outside the fixed tank 110, the second high-pressure pump being connected to the fuel pump 140. This allows fluid to be supplied to the fuel pump 140 to drive the fuel pump 140.

As described above, according to the present invention, advantages of the fixed tank applying pressurizing/pump transfer method and the variable tank, which can contract and expand, are used simultaneously. Accordingly, fuel can be transferred to the final stage without being interrupted despite the changes of the attitude and acceleration of an aerial vehicle.

Although the present invention as described above has been described with reference to the illustrated drawing, it is not limited to the described embodiment, and it should be understood that the present invention may be changed and modified in various ways by those skilled in the art without departing from the spirit and scope of the present invention described in the following claims.

What is claimed is:

1. A fuel supply system for an aerial vehicle, the fuel supply system comprising:
   two fixed tanks which store fuel;
   a variable tank which is provided in one of the two fixed tanks and stores fuel;
   a fuel supply flow path which is connected at one end thereof to the variable tank and passes through the two fixed tanks; and
   a fuel pump which is provided in another of the two fixed tanks which does not have the variable tank, an outlet side of the fuel pump being connected to the fuel supply flow path,
   wherein when the fuel contained in the other fixed tank which does not have the variable tank is supplied to the fuel supply flow path by operation of the fuel pump, the fuel contained in the variable tank is not supplied to the fuel supply flow path,
   wherein a first fuel control valve is provided in the fuel supply flow path on an upstream side of the fuel pump so as to control fuel supply from the variable tank,
   wherein the fuel is selectively supplied from one of the variable tank and the other fixed tank which does not have the variable tank,
   wherein the fuel contained in the fixed tank which does not have the variable tank is supplied through the fuel supply flow path when the fuel reaches an inlet of the fuel pump in a normal state of acceleration and attitude of the aerial vehicle,
   wherein the fuel contained in the variable tank is supplied through the fuel supply flow path when the fuel does not reach the inlet of the fuel pump due to change of acceleration and attitude of the aerial vehicle.

2. The fuel supply system of claim 1, further comprising:
   a pressurizing tank storing pressurizing gas to pressurize the two fixed tanks.

3. The fuel supply system of claim 2, further comprising:
   a pressurizing flow path connected to the two fixed tanks from the pressurizing tank; and
   a plurality of pressure control valves provided in the pressurizing flow path at locations inside the two fixed tanks, respectively.

4. The fuel supply system of claim 3, wherein control pressures of the plurality pressure control valves are different from each other.

5. The fuel supply system of claim 1, wherein a pressure discharge valve is provided in the fixed tank having the variable tank, and pressure of the fixed tank is discharged to the outside via the pressure discharge valve when refilling the variable tank with fuel.

6. The fuel supply system of claim 1, wherein a high-pressure pump is provided in the fuel supply flow path at a location outside the fixed tanks, the high-pressure pump being configured to supply fluid to the fuel pump through the fuel supply flow path connected thereto.

* * * * *